United States Patent [19]
Ellingson et al.

[11] Patent Number: 5,579,152
[45] Date of Patent: Nov. 26, 1996

[54] TUNABLE OPTICAL PARAMETRIC OSCILLATOR

[75] Inventors: Randall J. Ellingson, Ithaca, N.Y.; Peter E. Powers, Livermore, Calif.; Lap K. Cheng, Bear, Del.; Chung L. Tang, Ithaca, N.Y.

[73] Assignee: Cornell Research Foundation, Inc., Ithaca, N.Y.

[21] Appl. No.: 375,106

[22] Filed: Jan. 19, 1995

Related U.S. Application Data

[63] Continuation-in-part of Ser. No. 165,797, Dec. 13, 1993, abandoned.
[51] Int. Cl.[6] ..................................................... G02F 1/39
[52] U.S. Cl. .............................. 359/330; 372/20; 372/22
[58] Field of Search .................................. 359/326, 328, 359/330; 372/20–22, 97–99

[56] References Cited

U.S. PATENT DOCUMENTS

| | | | |
|---|---|---|---|
| 4,485,473 | 11/1984 | Tang et al. | 372/18 |
| 4,639,923 | 1/1987 | Tang et al. | 372/21 |
| 5,017,806 | 5/1991 | Edelstein et al. | 359/330 |
| 5,033,057 | 7/1991 | Bosenberg et al. | 372/72 |
| 5,034,951 | 7/1991 | Edelstein et al. | 372/22 |
| 5,047,668 | 9/1991 | Bosenberg | 359/330 |
| 5,053,641 | 10/1991 | Cheng et al. | 359/330 |
| 5,181,211 | 1/1993 | Burnham et al. | 372/21 |
| 5,291,503 | 3/1994 | Geiger et al. | 372/21 |
| 5,296,960 | 3/1994 | Ellingson et al. | 359/330 |
| 5,311,352 | 5/1994 | Bierlein et al. | 359/326 |
| 5,333,142 | 7/1994 | Scheps | 372/22 |
| 5,365,366 | 11/1994 | Kafka et al. | 359/330 |
| 5,371,752 | 12/1994 | Powers et al. | 359/330 X |
| 5,377,043 | 12/1994 | Pelouch et al. | 359/326 |
| 5,383,198 | 1/1995 | Pelouch et al. | 372/18 |
| 5,406,408 | 4/1995 | Ellingson et al. | 359/330 |

OTHER PUBLICATIONS

Pelouch et al., "Ti:Sapphire–Pumped, High–Repetition–Rate Femtosecond Optical Parametic Oscillator", Optics Letter, vol. 17, No. 15, Aug. 1, 1992, pp. 1070–1072.

Vanherzeele et al., "Magnitude of the Nonlinear–Optical Coefficients of $KTiOPO_4$," Optics Letters, vol. 17, No. 14, Jul. 15, 1992, pp. 982–984.

Kafka et al., "A Synchronously Pumped Parametric Oscillator Producing 40 fsec Pulses", Digest of Conference on Lasers and Electro Optics, Optical Society of America, Washington, D.C., 1993, pp. 68–69 (Postdeadline Papers) [No Month].

Wachman et al., "cs Femtosecond Pulses Tunable in the Near–and Midinfrared", J. Appl. Phys. 70(3), 1 Aug. 1991, pp. 1893–1895.

Bosenberg et al., "Type II Phase Matching in a β–Barium Borate Optical Parametric Oscillator", Appl. Phys., Lett. 56(19), 7 May 1990. pp. 1819–1821.

Laenen et al., "Broadly Tunable Femtosecond Pulses Generated by Optical Parametric Oscillation", Optics Letters, Sep. 1, 1990, vol. 15, No. 17, pp. 971–973.

(List continued on next page.)

Primary Examiner—John D. Lee
Attorney, Agent, or Firm—Jones, Tullar & Cooper, P.C.

[57] ABSTRACT

A broadly tunable femtosecond optical parametric generator includes a cavity having a pumping section in which is located a nonlinear crystal selected from the group CTA and RTA, cut for noncritical phasematching. The plane of the optical x axis and or the optical y axis of the crystal is aligned with the axis of the pumping section. A Ti:S laser pumping beam is directed into the pumping section either collinearly or noncollinearly with the pumping section axis and impinges on the crystal to produce signal and idler beams. The laser is tunable to produce OPO output beams between about 1 and 4 µm.

21 Claims, 13 Drawing Sheets

OTHER PUBLICATIONS

Kendall et al., "Non–Critical Phase–Matched Second Harmonic Generation by . . . ", presented at ISAF 1990, Urbana, IL., Jun. 1990, 4 pp.

Nebel et al., "Noncritically Phase–Matched Continuous–Wave Mode–Locked Singly . . . ", J. Opt. Soc. Am. B, vol. 10, No. 11, Nov. 1993, pp. 2195–2200.

Edelstein et al., "Broadly Tunable High Repitition Rate Femtosecond Optical Parametric Oscillator", Appl. Phys. Lett. 54(18), 1 May 1989, pp. 1728–1730.

Wachman et al., "Continuous–Wave Mode–Locked and Dispersion–Compensated Femtosecond Optical Parametric Oscillator", Optics Letters, Jan. 15, 1990, vol. 15, No. 2, pp. 136–138.

Spence et al., "Regeneratively Initiated Self–Mode–Locked Ti:sapphire Laser", Optics Letters, vol. 16, No. 22, Nov. 15, 1991, pp. 1762–1764.

Spence et al., "60–fsec Pulse Generation from a Self–Mode–Locked Ti:sapphire Laser", Optics Letters, vol. 16, No. 1, Jan. 1, 1991, pp. 42–44.

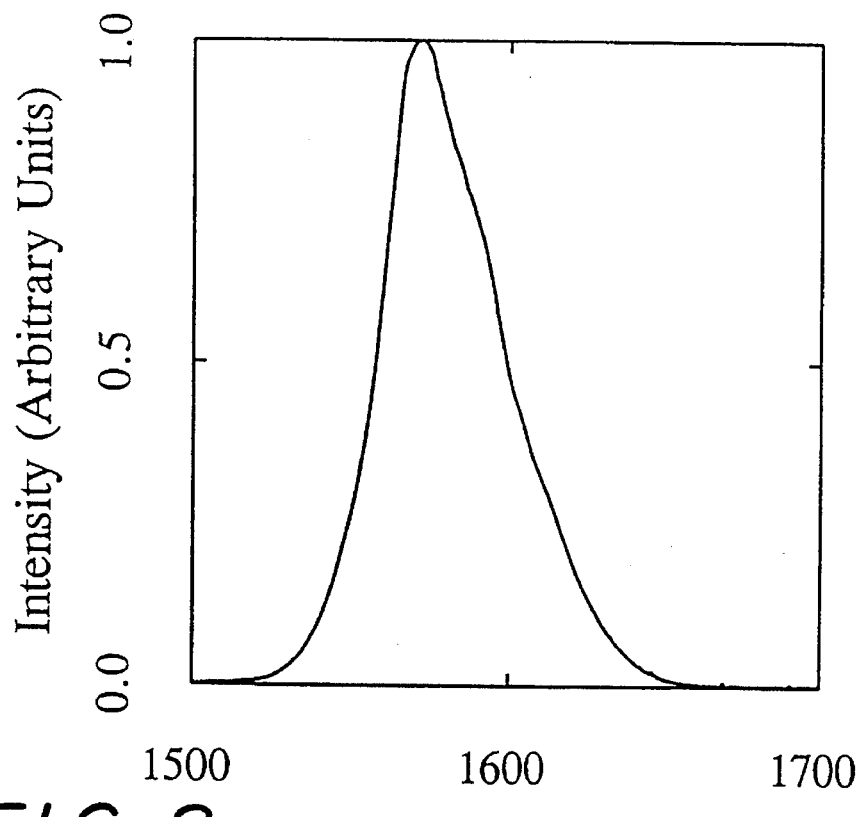
FIG. 8 Wavelength (μm)
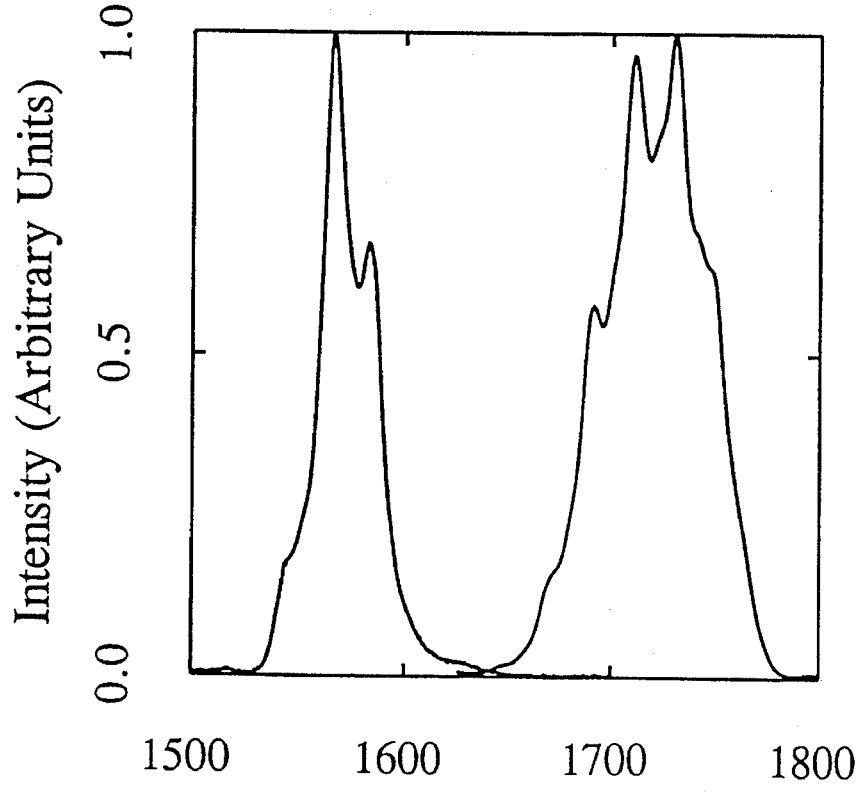
FIG. 9 Wavelength (μm)

TUNABLE OPTICAL PARAMETRIC OSCILLATOR

This invention was made with Government support under Contract No. F49620-90-C-0039 awarded by the Air Force Office of Scientific Research and under Grant No. ECS-9108570 awarded by the National Science Foundation. The Government has certain rights in the invention.

This application is a continuation-in-part of U.S. Ser. No. 08/165,797 (now abandoned), of Ellingson et al, filed Dec. 13, 1993 entitled "Type II Noncritical Phasematched, Pump-Tuned, KTP Optical Parametric Oscillator", which is assigned to the assignee of the present application.

BACKGROUND OF THE INVENTION

The present invention relates, in general, to optical parametric generators having high repetition rate, femtosecond output pulses tunable over a large range in the near infrared, and more particularly to tunable optical parametric oscillators (OPO) and optical parametric amplifiers (OPA) utilizing nonlinear crystals. The invention further relates to tunable, noncritically phasematched optical parametric generators utilizing nonlinear crystals capable of operation in any x-y crystal orientation.

Laser pulses in the femtosecond time domain have become important in the study of extremely short-duration events such as chemical reactions, and for studying the dynamics of high-speed semiconductor electronic and optical devices. A particularly interesting region of optical study lies in the near to mid-infrared, and for this purpose a tunable source of optical pulses in that wavelength range is required.

Femtosecond OPOs have been demonstrated which exploit the high peak powers and high-repetition rates of the femtosecond Ti:Sapphire laser to produce high-repetition-rate femtosecond pulses broadly tunable in the near and mid-infrared. In particular, the nonlinear crystal $KTiOPO_4$ (KTP) has been used successfully in a critically phase-matched geometry in both internally and externally-pumped OPO configurations in the femtosecond time domain. See, for example, Edelstein et al, "Broadly Tunable High-Repetition Rate Femtosecond Optical Parametric Oscillator", *Physics Letters*, Volume 54, page 1728 (May 1, 1989); Wachman et al, "Continuous-Wave Mode-Locked and Dispersion-Compensated Femtosecond Optical Parametric Oscillator", *Optics Letters*, Volume 15, Page 136 (1990); and Wachman et al, "CW Femtosecond Pulses Tunable in the Near- and Mid-Infrared", *Journal of Applied Physics*, Volume 70, Page 1893 (1991), as well as U.S. Pat. No. 5,017,806 to Edelstein et al, May 21, 1991. See also U.S. Pat. No. 5,377,043, issued Dec. 27, 1994, to Pelouch et al, entitled "Ti:Sapphire-Pumped, High Repetition Rate Femtosecond Optical Parametric Oscillator", and assigned to the assignee of the present application, the disclosure of which is hereby incorporated herein.

In the latter application, high power, high repetition rate, femtosecond pulses are produced over a broadly tunable range through the use of an externally pumped, self-mode-locked Ti:Sapphire laser. The output of the Ti:Sapphire laser is focused onto one surface of a nonlinear crystal, such as a KTP crystal, located in an optical parametric oscillator cavity. Tuning of the optical parametric oscillator is accomplished by three different mechanisms in that device. A first technique involves adjusting the length mismatch of the OPO cavity with respect to the pump cavity to produce a wavelength shift, with a wavelength range of 50 nm being obtained for a variation of 5 μm in the length of the cavity. A second way to tune the output of the OPO is to change the pump wavelength without changing the orientation of the crystal or the alignment of the OPO. A third way is to use the traditional method of adjusting the phase-matching angle of the crystal so that by rotating the crystal and adjusting the cavity length, the output of the OPO can be tuned over a wide range. However, there is still a need to simplify the operation and extend the wavelength range of the optical parametric oscillator.

SUMMARY OF THE INVENTION

It is, therefore, an object of the present invention to provide tunable femtosecond optical parametric generators, including oscillators and amplifiers, having extended tuning ranges.

Briefly, the optical parametric generator of the present invention has a cavity which includes two curved mirrors defining a pumping section in which a nonlinear crystal is located, and two flat mirrors for defining the ends of the cavity. The crystal is pumped by means of a femtosecond Ti:Sapphire pumping laser operating with a pulse width of less than about 100 fs, with the output of the laser beam polarized in the plane of the generator cavity, this plane being defined by the curved and flat mirrors. The crystal located in the pumping region between the two curved mirrors is a nonlinear crystal aligned along a selected optical axis of the crystal. The crystal may be cut for normal incidence along the x axis, along the y axis, or along an axis at an arbitrary angle Φ from the x axis. When the pump laser is directed onto the crystal along a selected axis, the crystal generates a resonated signal branch and a non-resonated idler branch. Both of the curved mirrors are coated for high reflection of the signal branch, while one curved mirror is coated for high transmission of the pump laser and the other is coated for high transmission of the idler wave. In this way, the idler pulse which is generated by the OPO is coupled out of the OPO cavity while the signal pulse is resonated in the OPO cavity. In one embodiment, the crystal may be KTP, for example, cut for Type II 90° noncritical phasematching (NCPM) along any arbitrary axis in the plane formed by the x and y axes of the crystal.

By orienting the crystal in the pump cavity at the correct phasematching angle $\theta_{pm}$, the signal beam, can be amplified at the expense of the pump beam, so that the generator operates as an optical parametric amplifier (OPA) having femtosecond pulse widths at a wavelength dependent on the wavelength of the pump laser. Crystals having a large nonlinearity, large phasematching bandwidth and a small group velocity mismatch for both critical and noncritical phasematching regimes are particularly well suited as OPA crystals for such femtosecond applications. The nonlinearity of such crystals, typically referred to as $d_{eff}$, gives a measure of the strength of the amplification of the signal wave; the larger the $d_{eff}$, the larger the amplification. The expression for $d_{eff}$ in the x-z plane for a type II interaction in an OPA is given by:

$$d_{eff} = d_{24} \sin \theta \qquad (Eq. 1)$$

where the angle θ is the phasematching angle for a given single wavelength to be amplified. For the crystals of the present invention, the angle θ is 40° and larger, so that $d_{eff}$ is large for the entire tuning range of the crystals. In the noncritically phasematched region, where θ=90°, the value of $d_{eff}$ is maximized, since sin 90°=1.

By directing the laser pump beam long an optical axis in the x-y plane of the crystal, with θ=90°, a noncritically phasematched (NCPM) optical parametric oscillator (OPO) is produced, in which the wavelengths of the signal-idler pair are determined by the wavelength of the pump laser. By tuning the pump laser wavelength from 0.7 to 1.1 μm, a calculated tuning range for the output wavelength in the possible crystal orientations for a KTP crystal is between 0.97 and 1.63 μm in the signal branch and 2.15 and 3.57 μm in the idler branch.

In another embodiment of the invention, in which a noncritically phasematched $CsTiOAsO_4$ (CTA) crystal is used with a pump laser tuned from 0.7 μm to 1.1 μm, the resulting signal branch output will be in the range of from about 1.46 to about 1.73 μm and the idler branch will range from about 1.27 to about 1.82 μm.

In still another embodiment of the invention, an $RbTiOAsO_4$ (RTA) crystal is used with a pump laser tuned from 0.7 μm to 1.1 μm to produce a signal branch output of from 1.03 μm to 1.3 μm. The RTA crystal also produces an idler branch output of from about 2.15 μm to about 3.65 μm or further into the infrared.

The useful crystal interaction length for prior critically phasematched optical parametric oscillators was limited by the Poynting vector walk off, as described by Wachman et al, J. Applied Physics 70, 1893 (Supra). In contrast, the 90° noncritical phasematching geometry of the OPO in accordance with the present invention provides the significant advantage of having no walk-off between the Poynting vector and the wave vector for any of the pump, signal, or idler waves. Because of this, the useful crystal interaction length is limited only by temporal walk-off due to group velocity mismatch between the three waves. In addition to removing the walk-off angle limitation on the useful crystal interaction length, the noncritical phasematching described herein permits the use of a coaxial pumping configuration which simplifies OPO and OPA alignment. Furthermore, the pumping configuration utilizing the herein-described crystals provides extended tuning ranges with high power at pulse widths of about 58 fs.

BRIEF DESCRIPTION OF THE DRAWINGS

The foregoing, and additional objects, features, and advantages of the present invention will become apparent to those of skill in the art from a consideration of the following detailed description of a preferred embodiment, taken in conjunction with the accompanying drawings, in which:

FIG. 8 is a typical spectrum from a resonated wave in a CTA OPO, with prisms in the OPO cavity;

FIG. 9 illustrates typical spectra from a nonresonated wave in a CTA OPO, with prisms in the OPO cavity;

DESCRIPTION OF PREFERRED EMBODIMENTS

Figure 1:
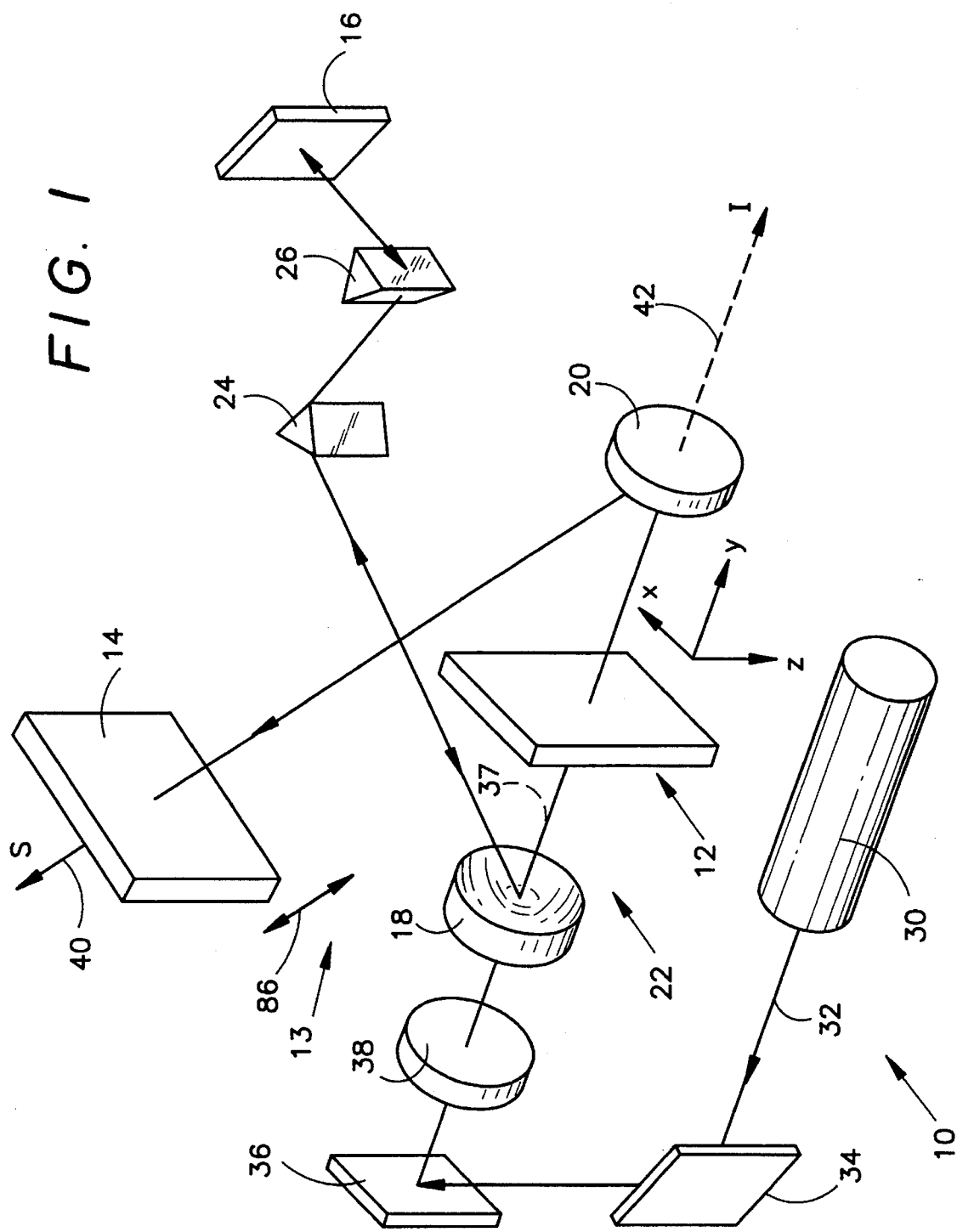
FIG. 1 is a diagrammatic illustration of an optical parametric oscillator having collinear pump geometry in accordance with a first embodiment of the present invention.

Turning now to a more detailed consideration of the present invention, there is illustrated in FIG. 1 in diagrammatic form a dispersion-compensated, type II noncritically phasematched (NCPM), optical parametric oscillator (OPO) generally indicated at 10. The OPO 10 is based, in a first embodiment of the invention, on the nonlinear crystal $KTiOPO_4$ (KTP), the crystal being generally indicated at 12. The OPO 10 includes a resonant cavity defined by first and second end mirrors 14 and 16, and a pair of curved, preferably spherical intermediate mirrors 18 and 20. The curved mirrors define a pumping section, or region, generally indicated at 22 in which is located the crystal 12. End mirrors 14 and 16 are flat, with mirror 14 providing an output coupling for the OPO, and mirror 16 providing a reflective end for the cavity. A pair of removable 60° prisms 24 and 26 are located in the OPO cavity 13 between mirrors 16 and 18 and are adjustable for correcting group velocity dispersion.

The OPO 10 is collinearly pumped by the pulsed output beam from a femtosecond Ti:Sapphire laser 30 such as that described in the above-noted U.S. Pat. No. 5,377,043. The laser 30 is tunable to produce an output pump beam 32 having a wavelength of between about 0.7 μm and 1.1 μm and having a pulse width of between about 50 and about 100 femtosecond (fs). The pump beam 32 is directed by steering mirrors 34 and 36 into alignment with the axis 37 of the pumping section 22 of the OPO 10. The pump beam 32 is plane polarized in the plane defined by mirrors 14, 16, 18, and 20 of the OPO cavity and is directed by way of lens 38 along axis 37 into the pumping cavity 22. The lens 38 focuses the pump beam 32 through the curved mirror 18 onto the crystal 12.

Crystal 12 is cut for 90° noncritical phasematching (NCPM) along a selected optical axis a at an angle Φ (FIG. 2a) from the x axis in the x-y plane of the crystal. The optical y-axis is at an angle Φ=90°, and the optical x-axis (FIG. 2(b)) is at an angle Φ=0°. The crystal is positioned in the cavity 22 to align the selected crystal optical axis a with the axis 37 of the pumping section 22. FIG. 1 illustrates the crystal 12 positioned with the axis a being the same as its optical y-axis, which is aligned with the axis 37. The incident femtosecond pulsed pump beam 32 causes crystal 12 to generate a corresponding signal branch femtosecond pulsed beam 40 and a corresponding idler branch femtosecond pulsed beam 42, the idler beam being generated upon each pass of the OPO signal beam through the cavity 13, with both the idler and the signal beams being in synchronization with the Ti:Sapphire pump beam 32, but at different wavelengths.

In the case where the signal beam is to be used, the crystal 12 is anti-reflection coated for the desired range of wavelengths which the crystal will generate in the signal branch, and optionally is anti-reflection coated for the wavelength of the Ti:Sapphire pump laser beam 32. Mirror 18 is coated for high reflection at the wavelengths of the oscillating signal beam 40 produced by the OPO, and for high transmission of the Ti:Sapphire pump laser beam 32. Mirror 20 is also coated for high reflection of the OPO signal beam 40, but is coated for high transmission of the OPO idler beam 42, instead of being coated for high transmission of the pump beam, so that the idler branch beam passes through mirror 20 and out of the OPO cavity, as illustrated.

Flat mirror 16 is coated for high reflectance at the wavelength of the OPO signal branch beam 40 so that the signal beam generated by crystal 12 is directed by mirror 18 through the prisms 24 and 26 to mirror 16, back through the prisms to mirror 18, through crystal 12 to mirror 20, and from there to the output coupling mirror 14, which couples the signal branch beam out of the OPO cavity. If desired, the idler beam may be selected instead of the signal beam.

As noted above, FIG. 2(a) illustrates, in diagrammatic form, the orientation of the crystal 12 for noncritical phasematching along the optical y-axis of the crystal. The pump and signal beams 32 and 40 are parallel to the axis 37 of the cavity and to the y-axis of the crystal, and are polarized along the crystal's optical x-axis, which is parallel to the plane defined by the OPO cavity. The beams 32 and 40 see the refractive index $n_x$ in the crystal. The idler beam 42 generated by the crystal is polarized along the crystal's optical z-axis and sees the refractive index $n_z$ in the crystal.

Figure 2A:
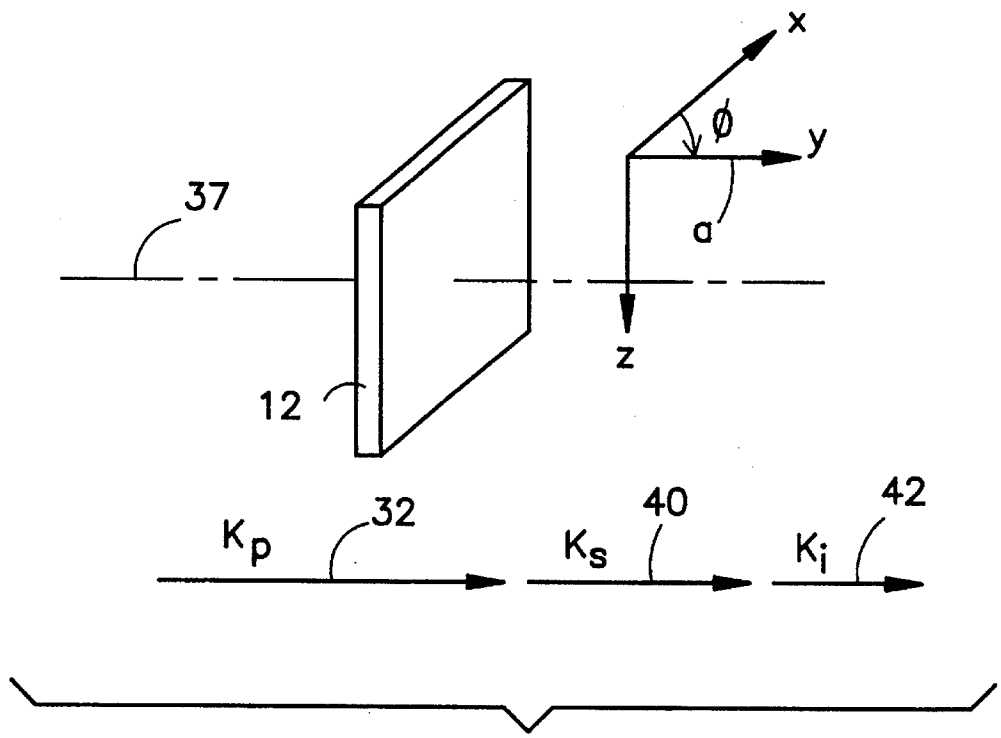
FIG. 2(a) illustrates the orientation of a nonlinear crystal for noncritical phasematching along its optical y-axis.
Figure 3:
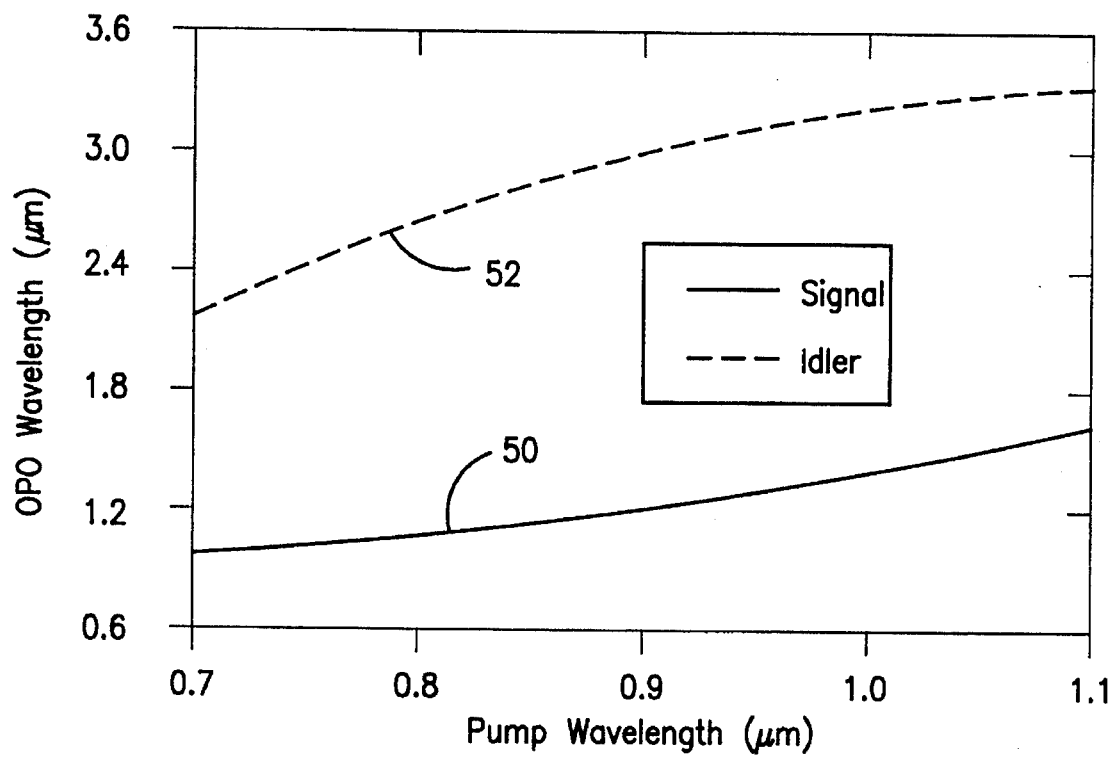
FIG. 3 is a graphical illustration of pump-tuning for a noncritically phasematched KTP optical parametric oscillator pumped along its optical y-axis.

The wavelengths of the generated signal and idler beams 40 and 42 in the device of FIG. 2(a) vary with changes in the wavelength of the pump beam 32 directed along the optical y-axis, as illustrated in FIG. 3. Curve 50 represents the change in wavelength for the signal branch, and curve 52 represents the change in wavelength for the idler branch as the wavelength of the pump 32 changes from 0.7 μm to 1.1 μm, to thereby provide a tunable OPO.

Figure 2B:
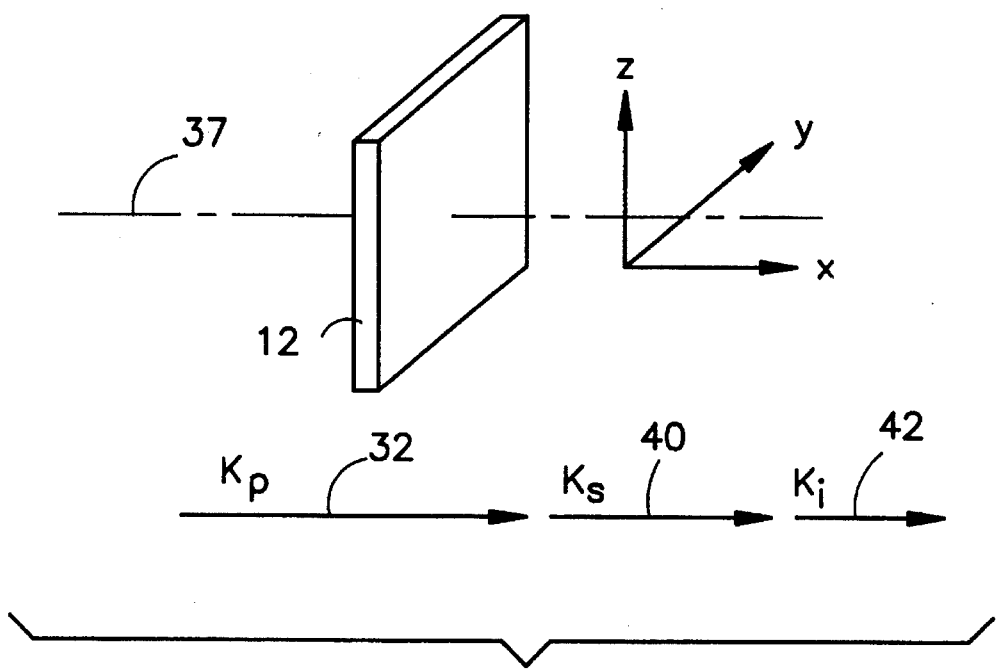
FIG. 2(b) is a diagrammatic illustration of the orientation of a nonlinear crystal for noncritical phasematching along its optical x-axis.

FIG. 2(b) illustrates, in a diagrammatic form, a crystal 12 oriented for noncritical phasematching along its optical x-axis. In this case the pump and signal beams 32 and 40 are polarized along the optical y-axis of the crystal, which is now parallel to the plane defined by the OPO cavity, and these beams see the refractive index $n_y$ in the crystal. The OPO idler beam is polarized along the z-axis of the crystal 12, and sees the refractive index $n_z$ in the crystal.

Figure 4:
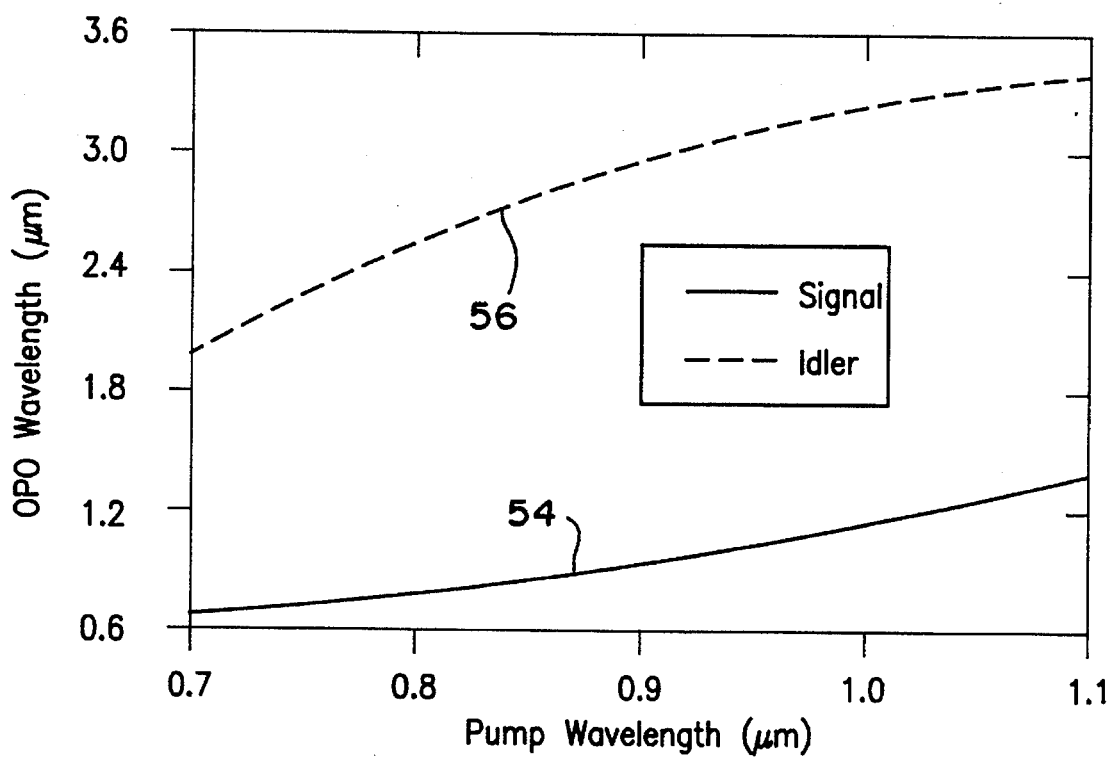
FIG. 4 is a graphical illustration of pump-tuning for a noncritically phasematched KTP optical parametric oscillator pumped along the optical x-axis.

FIG. 4 illustrates the tuning curves 54 and 56 for the signal and idler beams, respectively, when the crystal 12 is pumped along its optical x-axis, the curves representing variations in the beam wavelengths as the wavelength of pump beam 32 is varied from 0.7 to 1.1 μm to thereby tune the OPO.

In KTP, the expression for the effective optical nonlinearity ($d_{effective}$) for a type II nonlinear interaction in an OPO is:

$$d_{effective}(\text{Type II}) = -(d_{15} \sin^2 \rho + d_{24} \cos^2 \rho) \sin \theta \quad \text{(Eq. 2)}$$

where Φ is the angle between the optical x-axis of the crystal and the axis of the OPO cavity, and θ is the phasematching angle. Since $d_{24}$ is approximately twice as large as $d_{15}$ in KTP, using 90° noncritical phasematching pumping along the optical x-axis of the crystal results in a larger value for $d_{effective}$ than for either NCPM pumping along the optical y-axis or critical phasematching (with θ<90°) in either the x-z or y-z planes.

Figure 5:
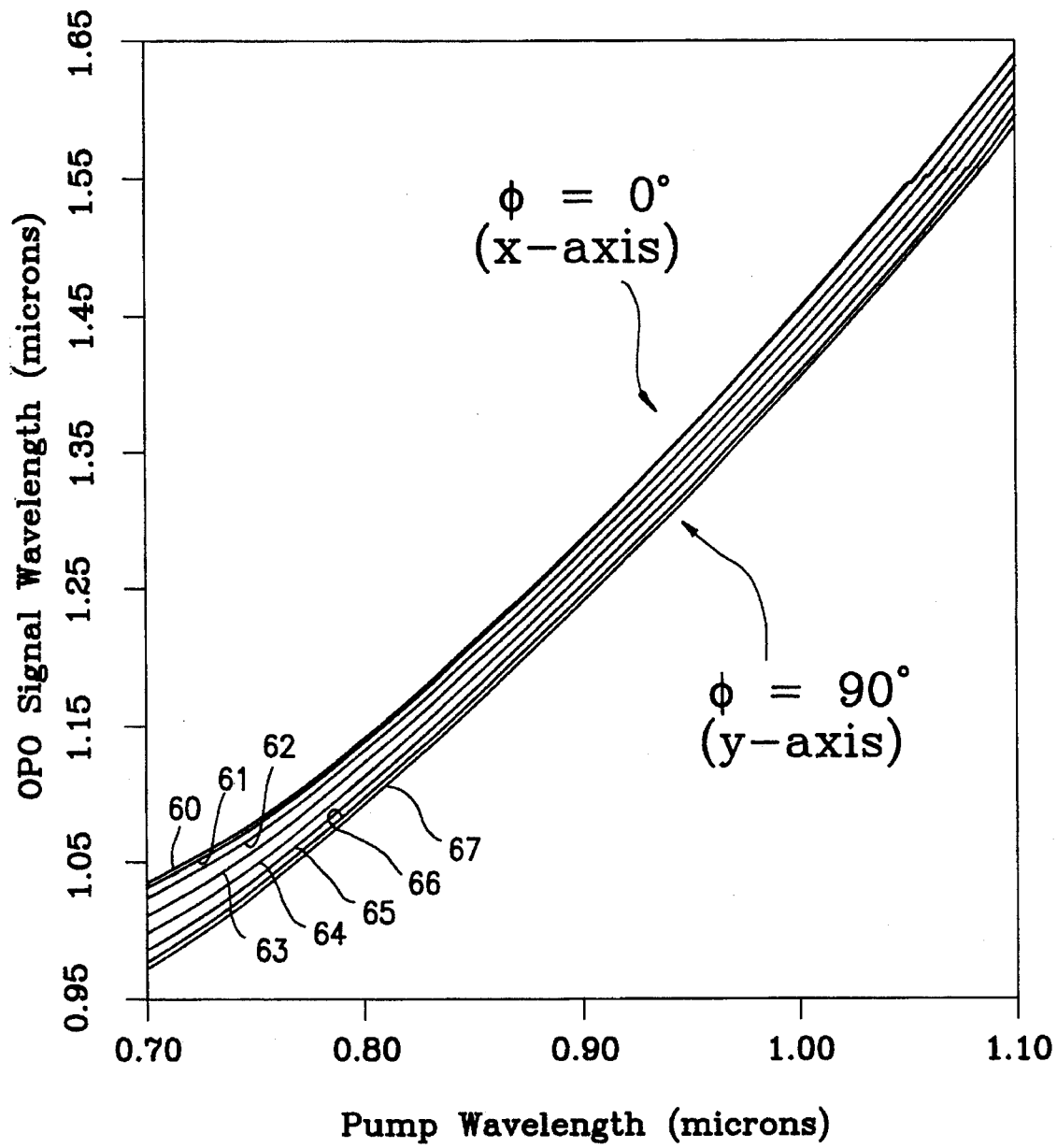
FIG. 5 is a graphical illustration of the signal waves for a pump-tuned OPO pumped at selected angles.

As illustrated in FIG. 5, there is a smooth variation in the accessible tuning range of the signal beam as the position of the crystal with respect to the axis 37, and with respect to of the collinear pump, signal and idler beams in the x-y plane (FIG. 2a), is changed from the x-axis (Φ=0°) to the y-axis (Φ=90°). The tuning range changes only a small amount as the angle Φ is varied from 0° to 90°, so there is a large degree of freedom in selecting the pumping axis a. As indicated by the above equation, $d_{eff}$, which is the primary determinant of the potential efficiency of the device, also changes smoothly with Φ between the x and y axes. FIG. 5 illustrates tuning curves 60–67 for the angles Ø=0°, 12°, 24°, 36°, 48°, 60°, 72°, and 84°, respectively. Similar curves can also be obtained from the idler wave.

From the foregoing it is seen that by orienting the crystal 12 so that the femtosecond Ti:Sapphire laser pump beam is directed along the x or y axis of the crystal, one can produce a 90° noncritically phase-matched OPO for which the wavelengths of the phase-matched signal and idler pair are determined by the wavelength of the pump laser.

The foregoing description relates to the use of a KTP crystal in an OPO. Another example of femtosecond pulsed NCPM optical parametric oscillation is a type I NCPM OPO based on the nonlinear crystal $LiB_3O_5$, in which control of the temperature of the crystal is the primary means of tuning the OPO. (See J. D. Kafka et al, *Digest of Conference on Lasers and Electroptics*, (Optical Society of America, Washington, D.C.) postdeadline session, p. 68.) Still another example is a type II NCPM optical parametric oscillator based on the nonlinear crystal gadolinium molybdate (GDM) which has a relatively large $d_{effective}$ along either the optical x- or optical y-axis, and has the same crystal symmetry as KTP. (See K. A. Kendagll et al, *Proceedings of the Seventh International Symposium on the Applications of Ferroelectrics*, June 1990.) Pump tuning of this material would result in an OPO output in the range of 1.39 to 2.6 μm.

In a second embodiment of the invention, the KTP crystal 12 is replaced by a $CsTiOAsO_4$ (CTA) nonlinear crystal to provide a different, and important, tuning range. CTA has about the same nonlinearity as KTP, but its tuning characteristics are quite different. In particular, for the pump wavelength produced by the Ti:Sapphire pump source, the CTA OPO oscillates at and near the important 1.55 μm spectral region for a noncritically phase-matched crystal.

The CTA crystal may be, for example, 1 mm thick and cut at θ=90°. For this crystal cut the Poynting vector and k vector of a beam propagating through the crystal are collinear, which permits a collinear-pumped OPO as illustrated in FIG. 1. The CTA crystal is aligned for a type II interaction ($o \to e+o$), which for this crystal cut means that the pump beam 32 and the OPO signal beam 40 (the o- wave) are polarized along the y-axis (FIG. 2b) and the idler beam 42 (the e-wave) is polarized along the z-axis of the CTA crystal. The k-vectors of the pump, the signal and the idler beams are along the x-axis. For a 90° crystal cut, the phase-matching is noncritical so there is little variation in the wavelength of the OPO output beams for a change in crystal angle as illustrated in FIG. 5. For this noncritical phase-matching regime, the CTA OPO is tuned by changing the pump wavelength, as discussed above for the KTP crystal. The theoretical tuning curves for $\theta=90°$, based on the Sellmeier equations, are shown in FIG. 6, with curve 80 representing the signal beam and curve 82 representing the idler beam.

A schematic of an experimental setup for the CTA crystal is the same as that for the KTP crystal, and is illustrated in FIG. 1. The CTA OPO may be pumped with a 1.1 W, 67 fsec Ti:Sapphire laser 30, tunable from at least 0.76 mm to at least 0.82 mm. To achieve the collinear pump geometry, the pump is focused by an R=15 cm curved mirror 36 through lens 38 and though the OPO curved resonator mirror 18 onto the crystal 12, which in this case is a CTA crystal. The transmission of the pump beam through mirror 18 varies from 27% to 80% over the Ti:Sapphire laser's tuning range, and the pump beam experiences another 5% reflective loss at the surface of the CTA crystal. The OPO resonator mirrors 18, 20, and 16 consist of two R=10 cm curved mirrors and a flat mirror respectively, all coated with a single stack, high reflecting coating centered at 1.5 μm. The other mirror in the cavity, the output coupler 14, reflects 98% at 1.5 μm. As the CTA OPO is a synch-pumped system, it is length matched to the Ti:Sapphire cavity. The CTA OPO cavity also incorporates a removable intracavity dispersion compensating prism pair 24,26. The prisms are SF14 and are spaced at 14 cm.

For the collinear cavity configuration of FIG. 1, it is easy to resonate either the idler (e-wave) or signal (o-wave) by choosing the appropriate mirror coating. Resonating the signal beam, as illustrated, is advantageous because over a large pump wavelength range the signal beam wavelength changes only slightly; for example, tuning the pump from 0.7 μm to 0.85 μm tunes the signal from 1.56 μm to 1.60 μm as illustrated in FIG. 6 by curve 80. This permits generation of the signal beam at a wavelength near 1.58 μm and tuning the idler from 1.27 to 1.82 μm. The advantage of resonating the idler is that the group velocity mismatch (GVM) between the pump and idler is small, near 30 fsec/mm, compared to ~200 fsec/mm between the signal and the pump, permitting the use of longer crystals without lengthening the pulsewidth substantially.

Figure 6:
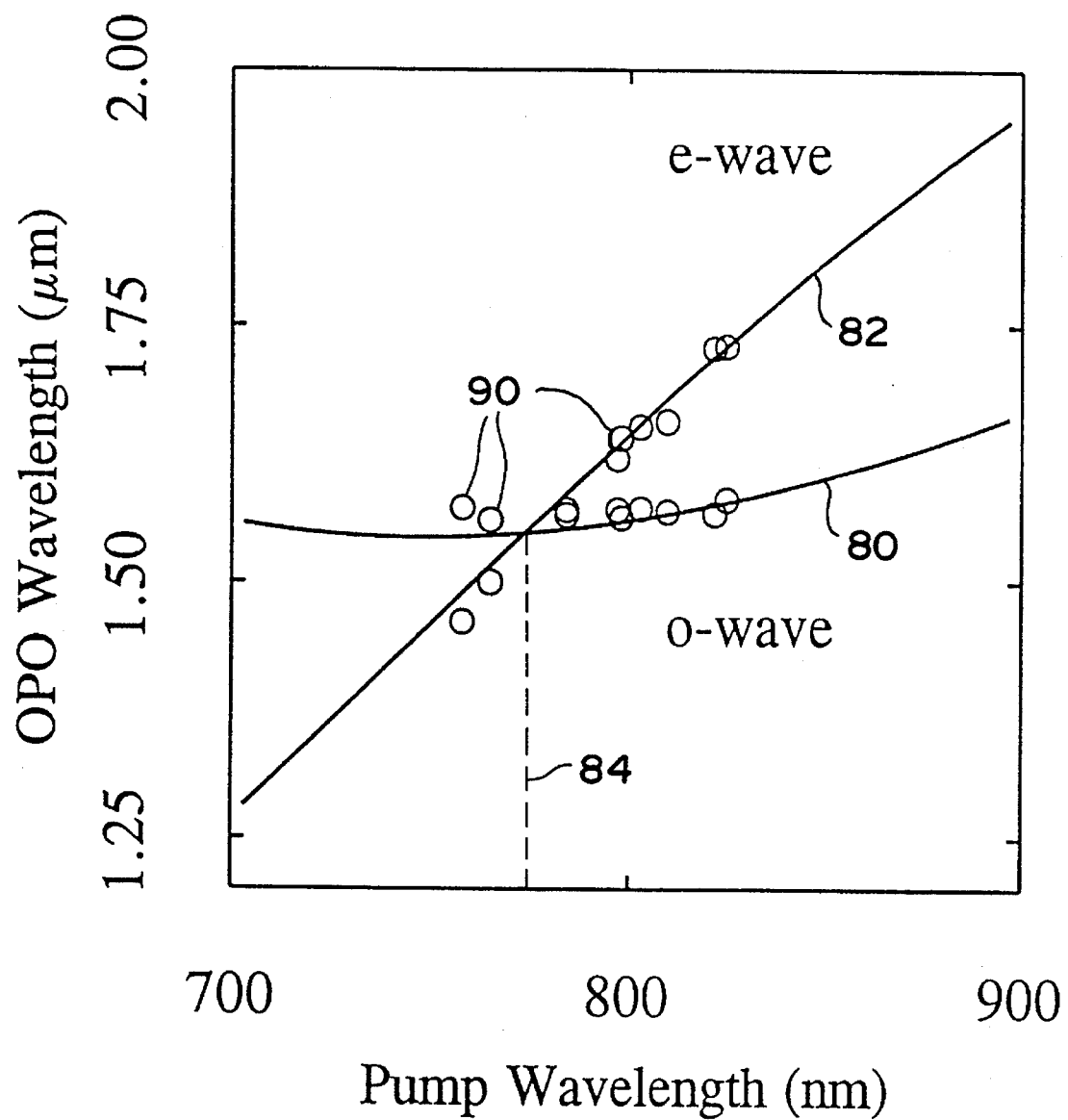
FIG. 6 illustrates theoretical tuning curves based on Sellmeir equations as well as measured values from a CTA OPO.

As illustrated in FIG. 6, for a 90° cut CTA crystal the wavelengths of the OPO idler and signal beams are close for pump wavelengths near 0.77 μm, indicated at 84. In this range, the OPO mirrors can resonate either the signal or the idler beams. Without prisms in the cavity a simple change in output coupler position indicated by arrow 86 in FIG. 1, determines which wave is resonated, since the two waves travel at different group velocities in the CTA crystal. For example, the difference in output coupler position between resonating at 1.56 μm and at 1.61 μ (for a 0.792 μm pump) is approximately 50 μm.

Resonating the signal beam without prisms in the cavity yields powers of as much as 100 mW in each wave for a 670 mW pump (inside the crystal), giving a conversion efficiency of approximately 30%. Typically the signal and idler beam pulses generated by the OPO are chirped; however, length detuning the cavity can result in chirp-free pulses at the expense of output power. Near degeneracy, where the OPO cavity mirrors reflect both the idler and the signal beams, the nonresonated idler is a train of pulses. This is a result of the different cavity round trip times for the nonresonated idler and the resonated signal beams.

The operation of the CTA OPO when resonating the idler beam without prisms gives powers similar to those obtained when resonating the signal. The power is ~70 mW per branch for a 400 mW pump (inside the crystal). The output of the idler is chirp free, and pulses as short as 62 fsec (assuming a $\text{sech}^2$ pulse shape) at an average power of 70 mW were observed in the above-described experimental set-up when pumped with a 65 fs Ti:Sapphire pump. The output of the nonresonated signal in this case is a pulse train similar to that seen on the output of the idler when the signal beam is resonated.

Figure 7:
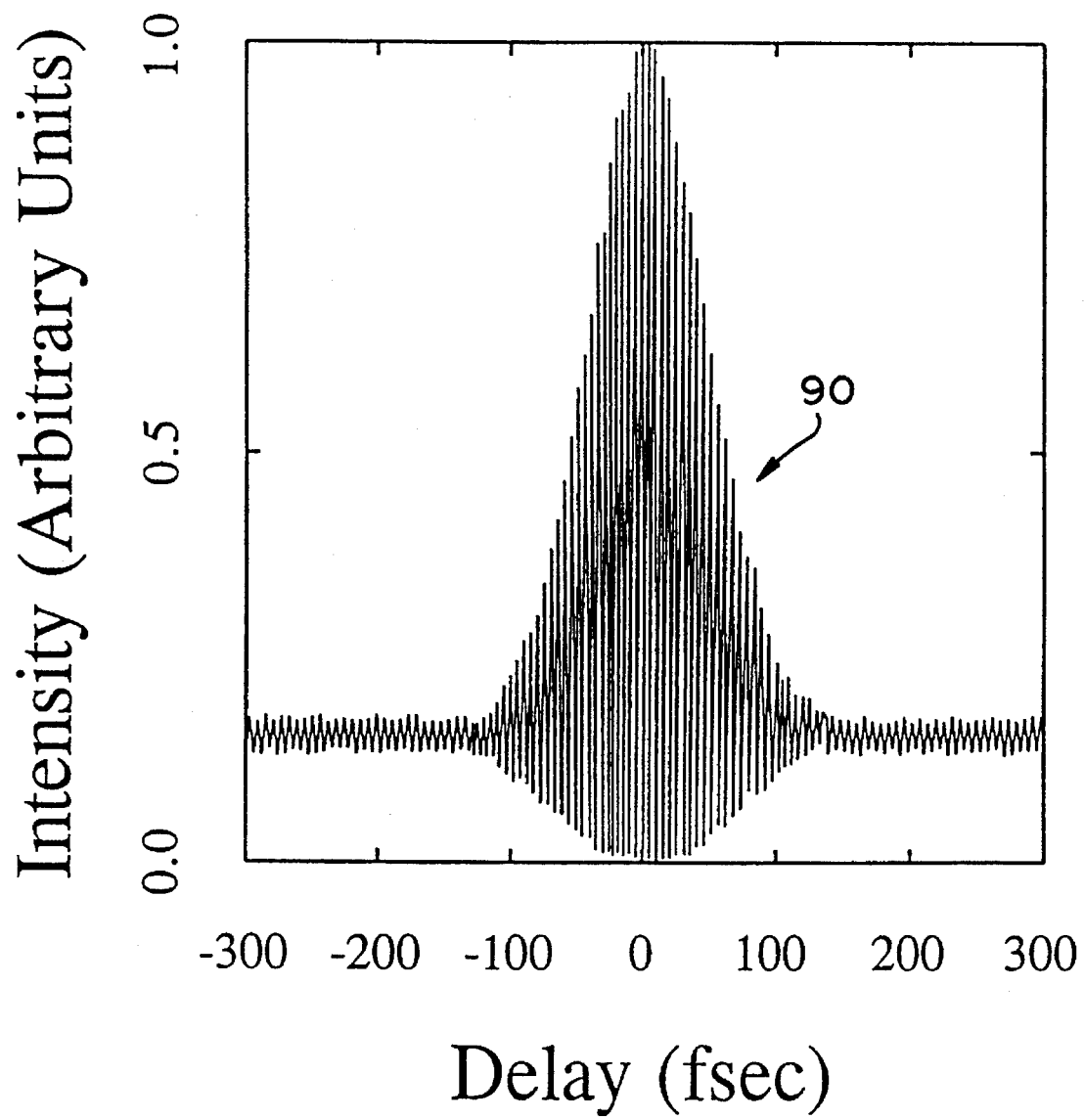
FIG. 7 illustrates the autocorrelation of a resonated idler wave from the CTA OPO of the invention.

The behavior of the CTA OPO with prisms is similar to that in the above-described OPO. There is a transition from chirped to chirp-free as the net cavity group velocity dispersion (GVD) changes from net positive to net negative GVD. The shortest pulses are encountered near 0 GVD. In both cases of resonating the idler or the signal near this 0 GVD point, the pulse width of the resonated wave is approximately equal to the pump pulsewidth. The shortest pulses measured in the experimental set-up were 64 fsec, obtained by resonating the idler beam with a 67 fsec Ti:Sapphire-pump pulsewidth. The time-bandwidth product for the operation of the OPO near 0 GVD was measured to be $\Delta\nu\Delta\tau \sim 0.34$ assuming a $\text{sech}^2$ pulse shape. A typical interferometric autocorrelation output pulse from a resonated idler beam in the CTA OPO is illustrated in FIG. 7 by curve 90. This pulse has a length of 72 fsec, again assuming a $\text{sech}^2$ pulse shape. The power coupled out of the cavity with prisms is reduced by about a factor of 2. For example, when resonating the signal with prisms at 1.58 μm, 55 mW of the signal wave is coupled out of the 2% output coupler, whereas 100 mW is coupled out without the prisms.

With the prisms in the cavity the nonresonated wave is coupled out of the cavity through the output coupler 20 and the prism sequence 24,26. The prisms are Brewster-cut and are oriented in the cavity in such a way that the resonated wave experiences low reflective losses. The nonresonated wave is orthogonally polarized to the resonated wave so that it experiences approximately a 20% loss per prism surface. The transmission for the nonresonated wave out of the output coupler shows two pulses. The amplitude of the second pulse is largest when the wavelength of the nonresonated wave is close to that of the resonated wave so there is little transmissive loss from the OPO cavity mirrors.

For the 90° crystal cut CTA, tuning was accomplished by changing the Ti:Sapphire pump wavelength. FIG. 6 shows at circles 90 measured wavelength values for idler and signal beams for different pump wavelengths, using the CTA OPO. Tuning the Ti:Sapphire pump 30 from 0.758 μm to 0.820 μm generates outputs from the OPO from 1.46 to 1.73 μm, as illustrated, with different output wavelengths being provided by the resonated and the nonresonated waves. A typical spectrum obtained from the resonated wave is shown in FIG. 7, and two typical spectra from the nonresonated wave are shown in FIG. 8. These spectra were all obtained with prisms in the cavity. It is noted that the spectra differ in that there is modulation on the spectra from the nonresonated wave. This modulation is even stronger when the prisms are not in the cavity. However, the spectrum obtained from the resonated wave does not show this modulation with or without prisms in the cavity.

A third embodiment of the invention replaces the KTP crystal with an $RbTiOAsO_4$ (RTA) crystal which has many of the favorable characteristics of KTP for use in an OPO, but has tuning characteristics which are sufficiently different from KTP, and from the above-described CTA crystal, that it is better suited for generation of certain output wavelengths, in particular wavelengths in the range of 3.65 μ or greater.

Figure 10:
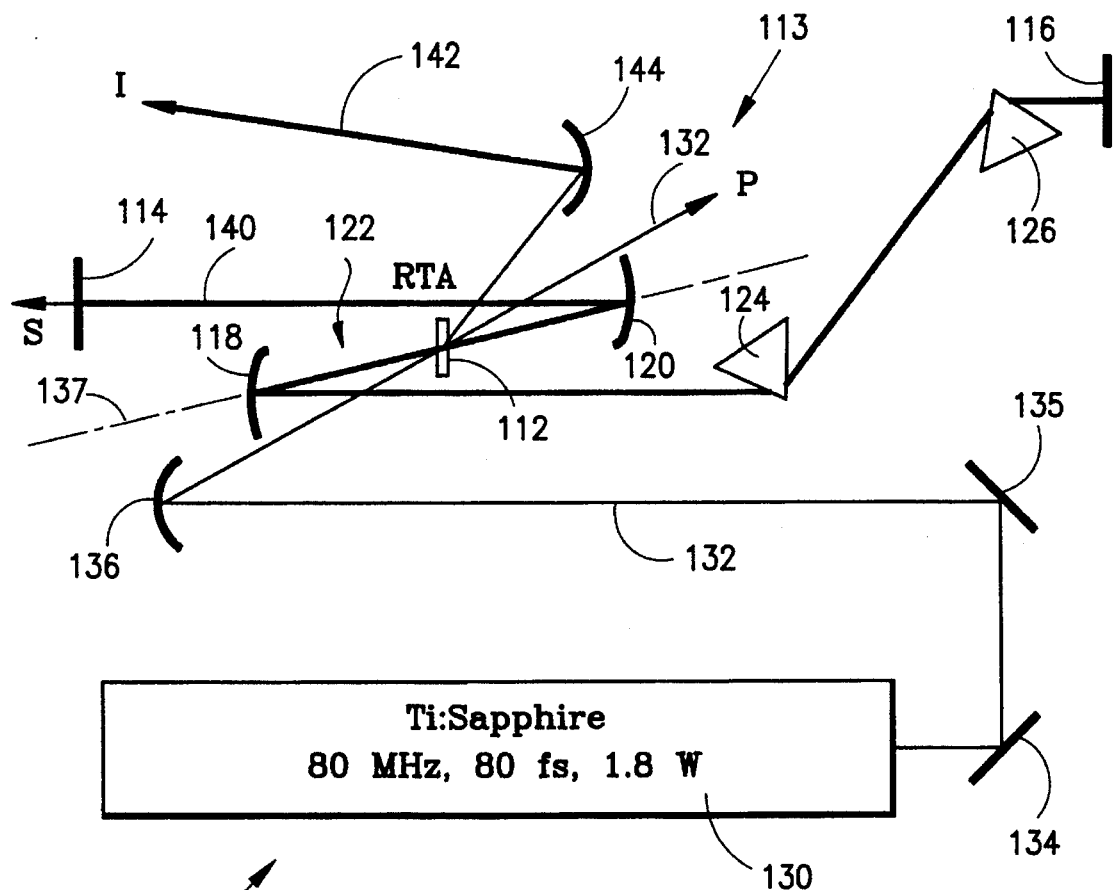
FIG. 10 is a schematic diagram of a Ti:Sapphire-pumped RTA OPO with noncollinear geometry.

The experimental setup generally indicated at 100 in FIG. 10 for the RTA crystal is similar to that for the KTP and CTA crystals described above, but with some differences. The RTA OPO 100 includes an RTA crystal 112 located in a resonant cavity 113 which includes end mirrors 114 and 116 and a pair of intermediate curved mirrors 118 and 120. These curved mirrors define a pumping section 122. A pair of removable prisms 124 and 126 are located in cavity 113 between mirrors 116 and 118.

The RTA OPO 110 is pumped by a 1.8 W, 80 fsec Ti:Sapphire laser 130 which is tunable from 0.760 μm to 0.820 μm and runs at 80 MHz. The output beam 132 from the Ti:Sapphire laser 130 is focused onto the TRA crystal by mirrors 134 and 135 and an R=15 cm mirror 136. In this example, the generated e-wave (idler) beam is resonated in the linear cavity 113 which includes the two R=10 cm curved mirrors 118 and 120, the flat high reflector 116, the output coupler 114, and the removable intracavity dispersion compensating prism pair 124,126. The OPO cavity mirrors 116, 118 and 120 are coated with a single-stack high reflector coating centered at 1.1 μm. The highest efficiency for the OPO was obtained using a 5% output coupler. The prisms 24,26 are SF14 and are spaced at 17 cm.

In the present embodiment the geometry of the OPO is noncollinear; that is, the pump beam 132 is introduced in to the OPO cavity 113 at an angle to the axis 137 of the pumping section 122. The pump beam is directed on to the surface of RTA crystal 112 at an angle which compensates for Poynting vector walkoff of the resonated beam in the cavity and is therefore, at an angle with the beam generated by the crystal and resonated in the cavity 113. In this case, the resonated beam is the e-wave, and this beam is at an angle of approximately 2.5° with the pump beam inside the crystal. The angle between the pump and idler k-vectors changes depending on the wavelength of the beam 142. An R=10 cm aluminum mirror 144 is positioned to collect and collimate the idler. As the RTA OPO is a synchronously-pumped system, it is length matched to the Ti:Sapphire cavity 130. Tuning the RTA OPO is accomplished by a combination of rotating the crystal and changing the pump wavelength.

Figure 11:
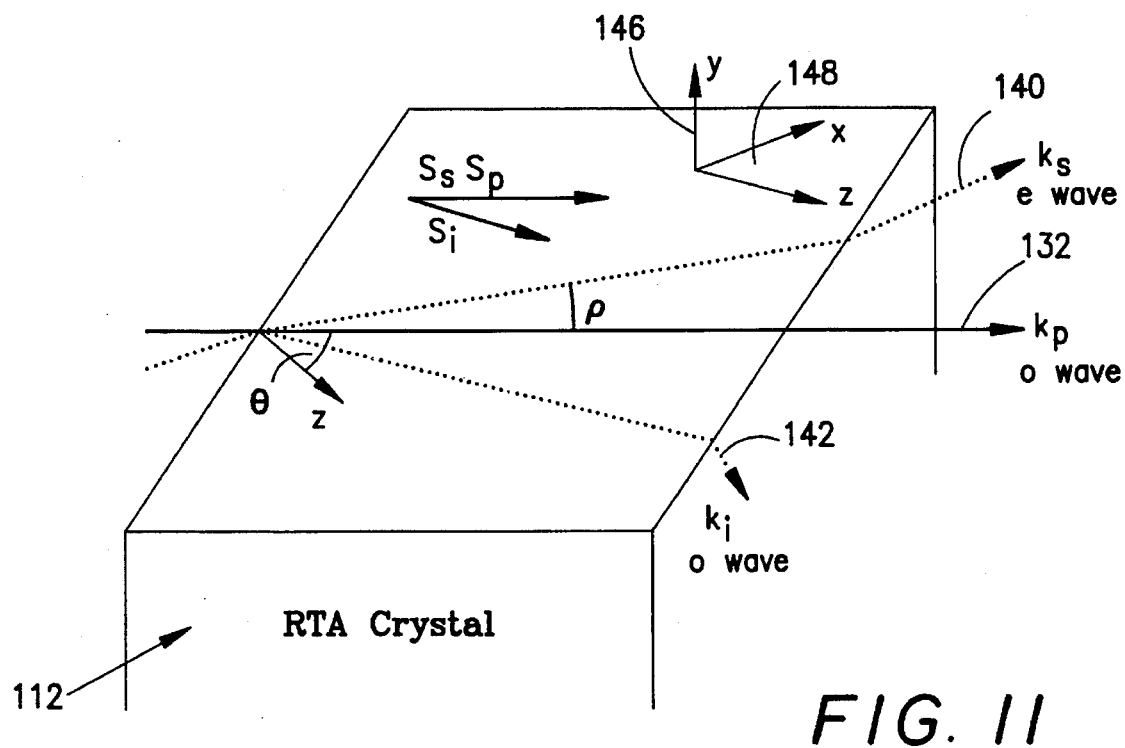
FIG. 11 is a diagrammatic illustration of RTA crystal orientation in the cavity of the OPO of FIG. 10, showing the directions of the k-vectors ($k_p$, $k_s$, $k_i$) and the Poynting vectors ($S_p$, $S_s$, and $S_i$), with ρ being the walkoff angle and θ being the phasematching angle.
Figure 12:
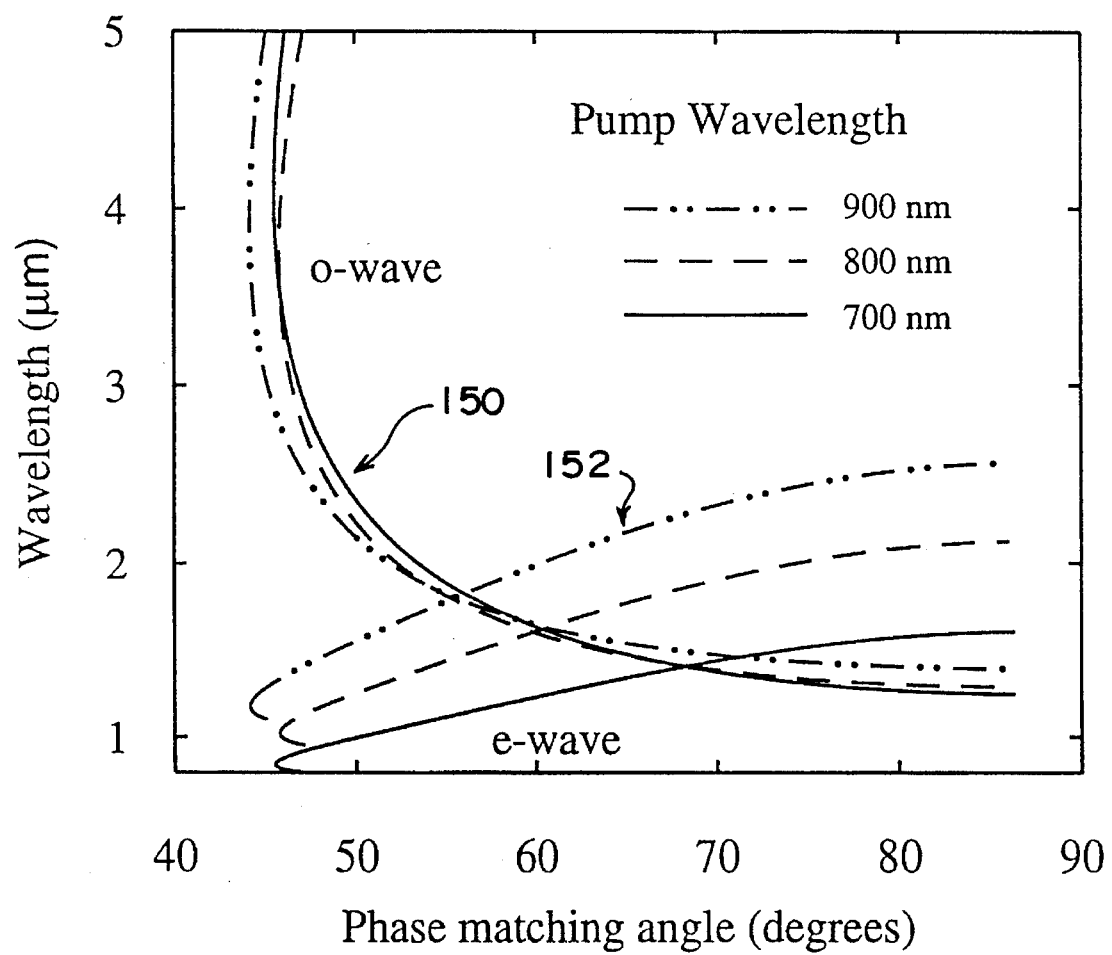
FIG. 12 illustrates theoretical tuning curves for a type II interaction in KTA with a noncollinear angle of 2.5°, for three pump wavelengths in the Ti:Sapphire laser range.

The RTA crystal 112 is a positive biaxial crystal with a transparency range extending out to 5 μm. Two different RTA crystals cut at θ=53° with thicknesses of 1.8 mm and 3.0 mm were used in the experimental set-up described above, with the 1.8 mm crystal being used for all measurements described herein except for idler wavelengths greater than 3 μm, where the 3 mm crystal was used. Both surfaces of the crystals were antireflection coated centered at 1.0 μm. Each crystal was aligned in the cavity for a type II interaction (o→e+o) which maximizes $d_{eff}$; FIG. 11 shows the crystal orientation. For type II interaction the pump beam 132 and the OPO o-wave (beam 142) are polarized along the y-axis 146 of crystal 112 and the e-wave is polarized in the x-z plane 148. The crystal is placed in the cavity so that the Poynting vector of the resonated e-wave 140 walks onto the Poynting vector of the pump o-wave 142. The tuning curves 150 and 152 for a type II interaction using various pump wavelengths in the Ti:Sapphire tuning range are shown in FIG. 12. The tuning curve calculations were made using the Sellmeier equations.

Figure 13:
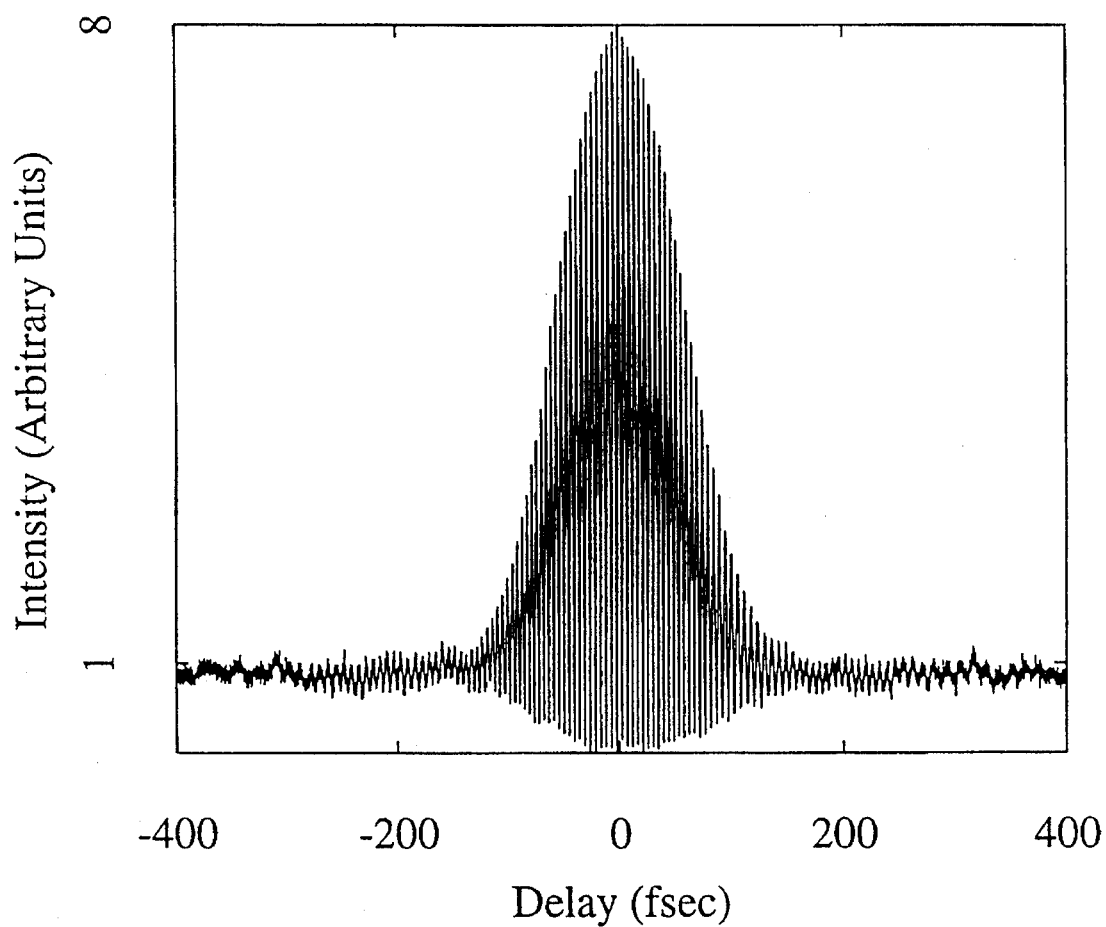
FIG. 13 illustrates an interferometric autocorrelation of a 76 fsec signal pulse at 1.2 μm.

In the experimental set-up of FIG. 10, the RTA OPO 100 operated in one of two regimes where the pulses were either chirped or chirp-free. The chirped pulses were seen when the net group velocity dispersion (GVD) was positive, and chirp-free pulses were encountered when the prisms in the cavity were adjusted for net negative GVD. Two differences in operation between the RTA OPO of FIG. 10 and the KTP OPO described above with respect to FIG. 1 were noted. The highest power coupled out of the KTP OPO occurred when operating without prisms in its cavity. With the RTA OPO of FIG. 10, the power was the same with or without prisms in the cavity. The second difference is that no change in power was observed in going from net positive to net negative GVD when changing the amount of prism glass in the cavity. The highest signal power coupled out of the cavity in the signal branch 140 was for chirp-free pulses (net negative GVD) with a pulsewidth of 76 fsec. Otherwise the signal output of the RTA OPO is similar to the KTP OPO, giving output pulses as short as the pump and powers as high as 250 mW at 1.2 μm. The shortest pulses in the e-wave 140 were measured to be 58 fsec, pumping with a 68 fsec Ti:Sapphire pulses, assuming a sech² pulse shape. A chirp-free interferometric autocorrelation of the pulses is shown in FIG. 13. The time-band-width product for the chirp-free pulses was $\Delta\nu\Delta\tau$~0.35. Tuning to longer wavelengths than 1.3 μm may be obtained by providing a longer wavelength optics coating than the one described above.

Figure 14:
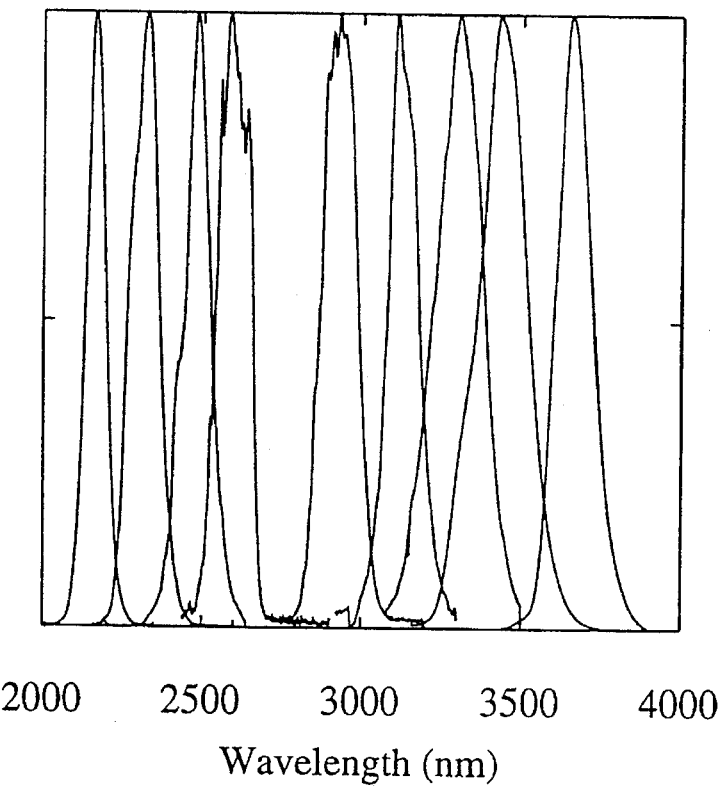
FIG. 14 illustrates the spectra of idler pulses in the OPO of FIG. 10.
Figure 15:
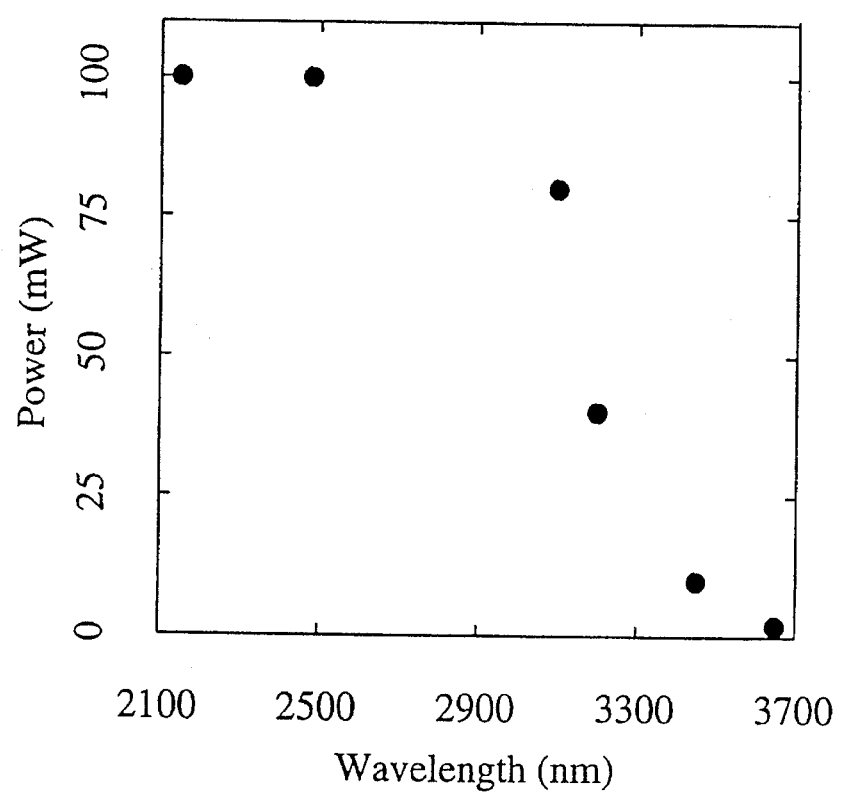
FIG. 15 illustrates idler power as a function of wavelength for a 2.5 W Ti:Sapphire pump and a 3 mm RTA crystal.

Spectra from 2.1 to 3.65 μm in the o-wave were measured and are shown in FIG. 14. As illustrated, water absorption caused a break in the tuning at 2.8 μm. Tuning was achieved by rotating the RTA crystal and then peaking up the cavity. The power in the beam 142 was typically as high as the power signal branch 140, with the highest output power measuring 200 mW which, along with signal power, gives a maximum conversion efficiency of 25%. As shown in FIG. 15, the power in beam 142 drops off for long wavelengths. The operation of the OPO for long wavelengths was more sensitive to length matching and cavity misalignment, indicating that the OPO was close to threshold. To get as high above threshold as possible in the long wavelength range, the output coupler 114 was replaced with a high reflector so as to reduce cavity loss. The Ti:Sapphire pump power was increased to 2.5 W and the 3 mm RTA crystal was used. These changes allowed for tuning out to 3.65 μm in beam 142. Surprisingly, with the increased crystal length, increased reflectivitity of the output coupler, and increased pump power, the o-wave power decreased to 100 mW at 2 μm from 200 mW.

The near-threshold operation for the longer wavelengths is attributed to the noncollinearity of the e-wave with the pump and signal. As seen in FIG. 11, the noncollinear geometry which compensates for the Poynting vector walkoff of the resonated signal from the pump also forces the nonresonated o-wave beam 142 to steer off both the e-wave beam 140 and the pump beam 132. The angle between the o-wave 142 and the pump 132 increases as the o-wave wavelength increases, and the larger this angle, the smaller the effective interaction length and the higher the threshold. When the OPO is operating near its maximum output power, the angle between the pump and o-wave inside the crystal is approximately 4°; when the o-wave tunes out to 3.65 μm, this angle increases to 9°. To tune out beyond 3.65 μm when resonating the e-wave 140 would further increase this angle and would require a further increase in the pump power to remain above threshold.

Alternatively, to extend the tuning range farther into the infrared, the o-wave 142 could be resonated in a collinear geometry. In this case since both the pump and the resonated waves would be o-waves, the Poynting vectors of these two waves would automatically overlap. The nonresonated e-wave 140 would then walk off at an angle of approximately 2.5°. The OPO is able to handle this walkoff angle since, when resonating the e-wave, the OPO operates with an angle between the idler and the pump of 4° or more. The most important consideration, however, is that beyond 3.7 μm, there is a broad absorption feature. This same feature is present in CTA as well. The absorption coefficient at 4 μm is approximately 0.04 mm$^{-1}$, which for a 1.5 mm crystal would give 6% absorption. For the OPO to handle this large an absorption loss in the crystal, the pump power has to be correspondingly higher. However, oscillating the o-wave 142 allows tuning to at least 3.65 μm without the power loss seen when resonating the e-wave 140.

Figure 16:
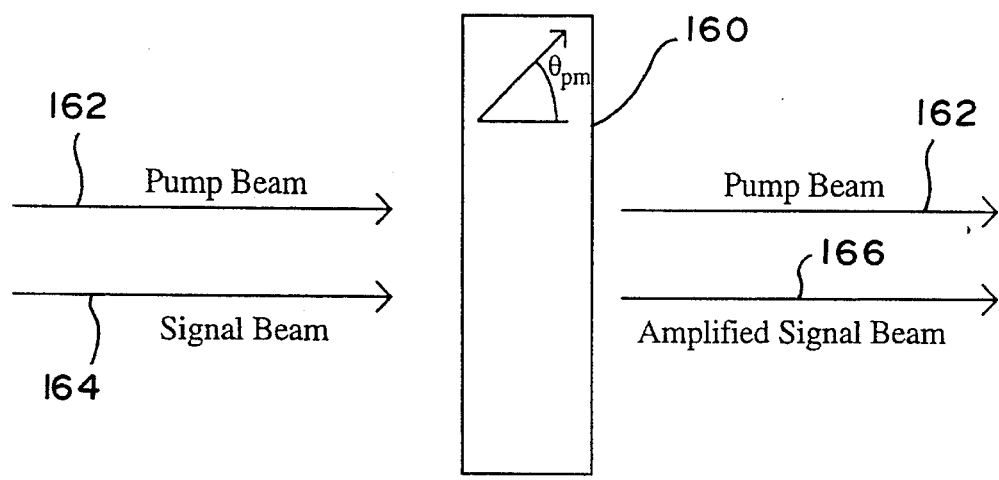
FIG. 16 is a diagrammatic illustration of an OPA.

The KTP, CTA and RTA crystals may also be used in femtosecond optical parametric amplifiers, as illustrated in FIG. 16. A nonlinear crystal 160 located in a linear cavity receives a pump beam 162 having a wavelength $\lambda_s$. Where the crystal 160 is at the correct phasematching angle $\theta_{pm}$, the signal beam will be amplified at the expense of the pump beam to produce an amplified output beam 166. KTP, CTA and RTA are particularly well suited as OPA crystals for femtosecond applications since they have a large nonlinearity, large phasematching bandwidth, and a small group velocity mismatch for both the critical and noncritical phasematching regimes.

The nonlinearity of the crystal, typically referred to as $d_{eff}$, gives a measure of the strength of the amplification of the signal wave. The larger the $d_{eff}$, the larger the amplification. $d_{eff}$ is maximum when the interaction occurs in the x-z plane with a type II interaction. For all of these crystals the expression for $d_{eff}$ in the x-z plane for a type II interaction is given by $$d_{eff} = d_{24} \sin \theta \qquad \text{(Eq. 3)}$$

Figure 17:
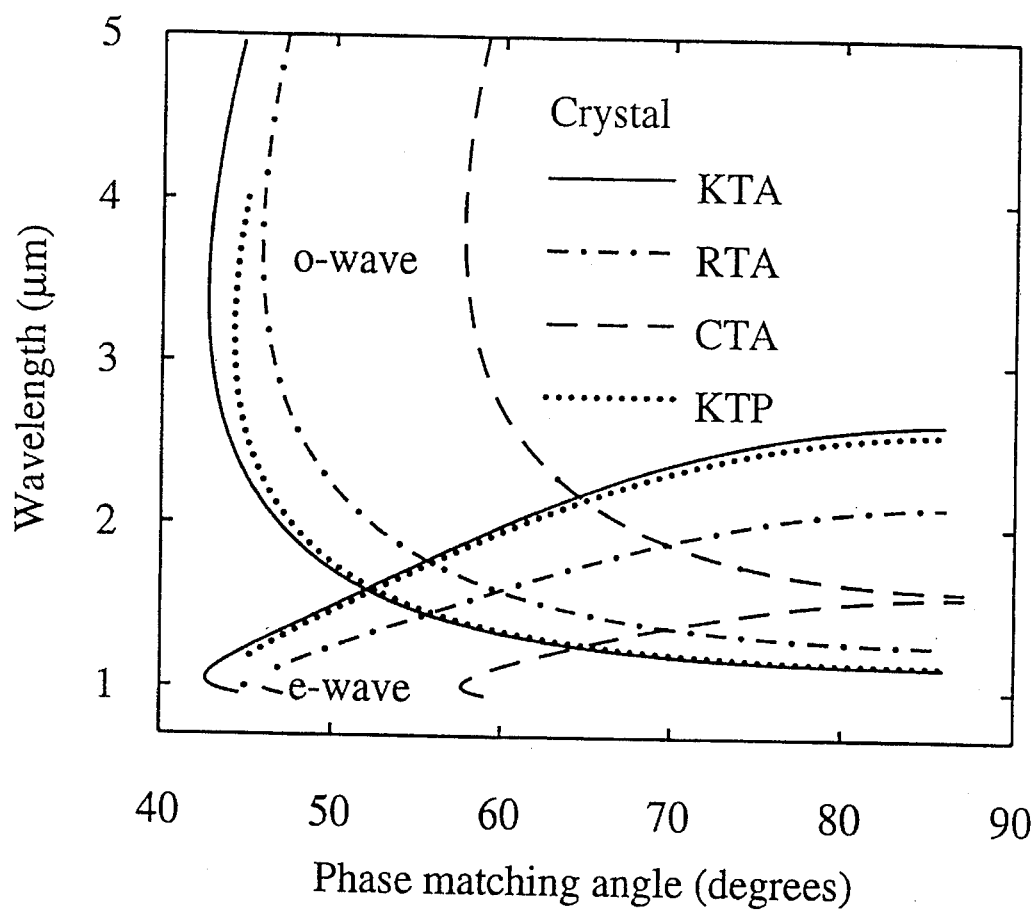
FIG. 17 illustrate tuning curves for various nonlinear crystals in the OPA of FIG. 16.

The angle, $\theta$, is the phasematching angle for a given signal wavelength to be amplified using a given pump source of wavelength $\lambda_p$. For KTP, CTA and RTA the angle $\theta$ is 40° and larger so that $d_{eff}$ is large for the whole tuning range for these crystals, as illustrated in FIG. 17. Note that in the noncritically phasematched region ($\theta=90°$) that $d_{eff}$ is maximized since sin $\theta=1$. FIG. 17 also illustrates tuning curves for KTA crystals, which are also suited for use in a femtosecond optical parametric amplifier. The OPA pump beam for obtaining these curves had an 800 nm wavelength, with the interaction being type II in the x-z plane.

The phasematching bandwidth (PMBW) is important for femtosecond pulses since all of the frequency components in a femtosecond signal pulse to be amplified need to be phasematched. The phasematching bandwidth of the crystal gives the bandwidth that the crystal can support. The PMBW is a function of the crystal length and phasematching angle, and is estimated by calculating the full width at half maximum of the function $$\frac{\sin^2 (\Delta k L /2)}{(\Delta k L/2)^2} \qquad \text{(Eq. 4)}$$

where L is the crystal length, and $\Delta k$ is the phase mismatch. For KTP, KTA, CTA, and RTA, the PMBW is large enough to support sub-100 fs pulse durations.

Figure 18:
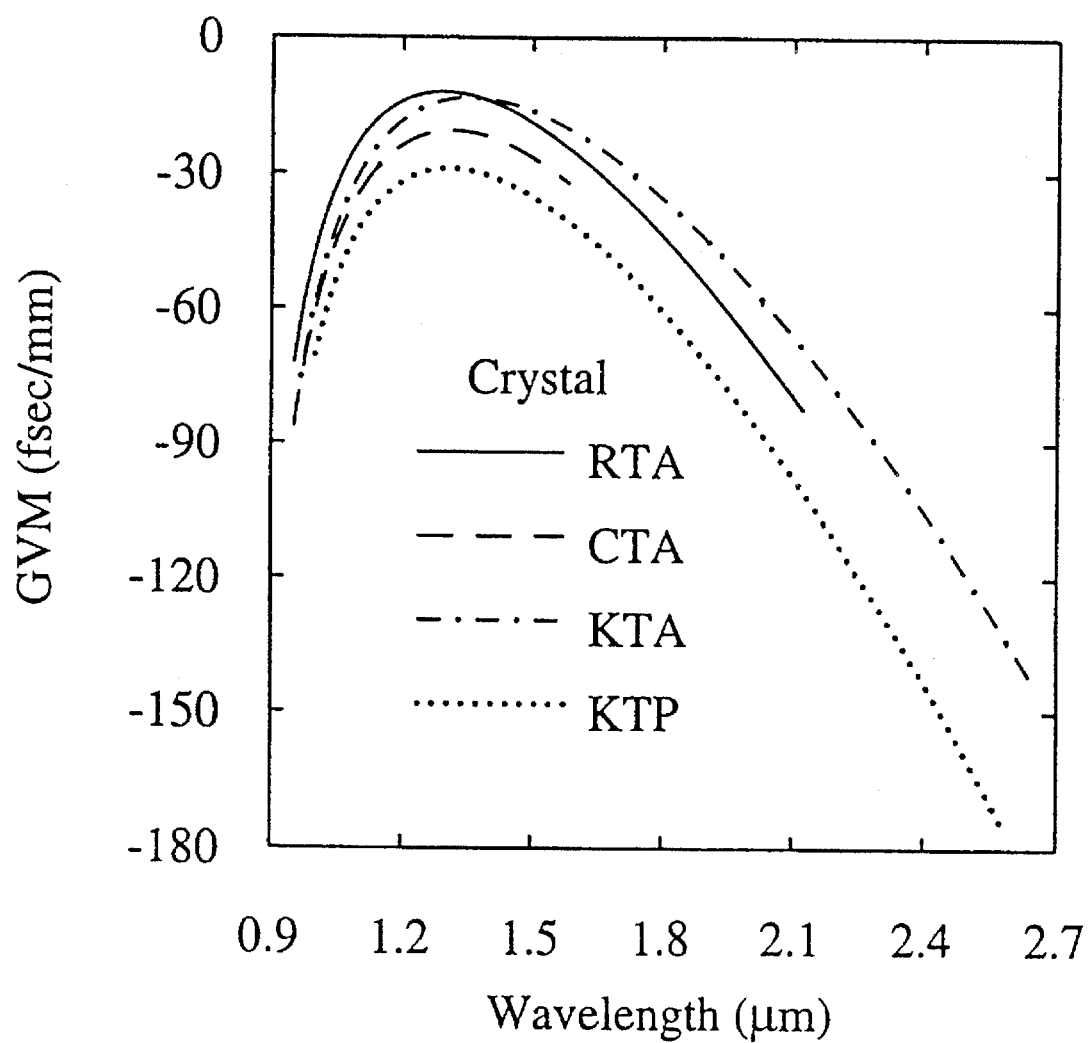
FIG. 18 illustrates calculated values of group velocity mismatch between an 800 nm pump wave and the OPOe wave.

The inverse group velocity mismatch (GVM) gives a measure of the temporal walkoff of two pulses of different wavelengths (or polarizations) through a crystal. For KTP, KTA, CTA, and RTA, the GVM is less than 180 fs/mm. This means that the signal pulse being amplified and the pump source will be well overlapped temporally. The calculated GVM between an 800 nm pump wave (polarized as an o-wave) and the signal to be amplified (polarized as an e-wave), is illustrated in FIG. 18 for these crystals.

Another nonlinear crystal which is appropriate for use in place of the KTP, CTA, or RTA crystals described above when constructing a 90° Type II NCPM OPO, with pumping along either of the optical x- or y-axis, is the relatively recently developed nonlinear crystal Potassium titanyl arsenate ($KTiOAsO_4$), or KTA. The wavelengths of 90° Type II NCPM OPO operation for KTA are: 1.0 to 1.58 μm, and 2.1 to 3.8 μm. All three of the crystals KTA, CTA, and RTA, have a larger effective nonlinearity than KTP for the 90° Type II NCPM OPO application, and thus result in higher efficiency and higher output power for a given pump power. In addition, these three crystals exhibit a transparency range which extends further into the IR than does the transparency range of KTP, and this achieves OPO operation at longer wavelengths than permitted by KTP. In addition to these three candidates, other nonlinear crystals which may prove useful in the 90° NCPM OPO operation as described herein include $LiIO_3$, $KNbO_3$, $LiNbO_3$, $AgGaSe_2$, and $AgGaS_2$. Because of varying optical properties of these materials, the pump wavelength ranges and operation tuning ranges will vary.

Although the invention has been described in terms of preferred embodiments, it will be understood that variations and modifications may be made without departing from the true spirit and scope thereof, as set forth in the following claims.

What is claimed is:

1. A broadly tunable femtosecond optical parametric generator, comprising:

a cavity having a pumping section defined by a first pair of spaced mirrors;

a nonlinear optical crystal in said pumping section of said cavity, said crystal being selected from the group consisting of KTP, CTA and RTA and having optical x, y, and z axes;

a tunable femtosecond pump laser producing a pumping beam having pulses of less than about 100 fs at a wavelength tunable between about 0.7 μm and 1.1 μm; and means directing said pumping beam to impinge on said crystal in said pumping section, said pumping beam lying in the plane of said crystal optical x and optical y axes to cause said pumping beam to generate in said crystal femtosecond idler and signal output beams at tunable wavelengths.

2. The generator of claim 1, wherein said crystal is KTP oriented for noncritical phasematching along its optical y-axis, said pumping beam being tunable to produce a femtosecond signal beam having a wavelength of between about 1.0 μm and about 1.6 μm and a femtosecond idler beam having a wavelength of between about 2.2 μm and about 3.5μm.

3. The generator of claim 1, wherein said crystal is KTP oriented for noncritical phasematching along its optical x-axis, said pumping beam being tunable to produce a femtosecond signal beam having a wavelength of between about 1.0 μm, and 1.6 μm and a femtosecond idler beam having a wavelength between about 2.2 μm and about 3.5 μm.

4. The generator of claim 1, wherein said pump laser is a Ti:S laser.

5. The generator of claim 1, wherein said pumping section has an axis, said crystal lies on said axis, and said pumping beam is coaxial therewith to provide a collinear geometry for said generator.

6. The generator of claim 5, wherein said crystal is located in said pumping section in such a way as to selectively position a selected one of said crystal optical axis to be parallel to said pumping section axes.

7. The generator of claim 6, wherein said pumping beam is polarized in a plane perpendicular to the pumping beam axis.

8. The generator of claim 7, wherein said signal beam is polarized in the plane of said pumping beam.

9. The generator of claim 7, wherein said idler beam is polarized in the plane of the z axis of said crystal.

10. The generator of claim 1, wherein said pumping section has an axis, said crystal has a selected optical axis aligned with said pumping section axis, and said pumping beam is directed into said pumping section at an angle to said pumping section axis to provide a noncollinear geometry for said generator.

11. The generator of claim 1, wherein said cavity further includes first and second flat mirrors defining first and second ends of the cavity, said first flat mirror totally reflecting a selected one of said signal and idler beams to provide a resonant oscillator cavity for said selected beam, and said second flat mirror being coated to at least partially transmit said selected beam to provide an output coupler.

12. The generator of claim 11, wherein said first pair of spaced mirrors comprises first and second curved mirrors, said first curved mirror transmitting said pumping beam into said pumping section and said second curved mirror being coated to transmit the nonselected one of said signal and idler beams out of said pumping section.

13. The generator of claim 1 wherein said crystal is CTA, said pumping beam being tunable to produce a signal beam having a wavelength of between about 1.56 µm and 1.60 µm and an idler beam having a wavelength of between about 1.27 µm and 1.82 µm.

14. The generator of claim 1, wherein said crystal is RTA, said pumping beam being tunable to produce a signal beam having a wavelength of between about 1.2 µm and about 2.4 µm and an idler beam having a wavelength of between about 2.1 µm and 3.65 µm.

15. The generator of claim 1, where said crystal is cut for noncritical phasematching.

16. A broadly tunable femtosecond optical parametric generator comprising:

a cavity including a pumping section;

a nonlinear optical crystal selected from the group consisting of KTP, CTA, $KNbO_3$, RTA, LiIO3, $LiNbO_3$, $AgGaSe_2$, and $AgGaS_2$ in said pumping section, said crystal having optical x, optical y, and optical z axes;

a femtosecond pump laser having a pumping beam; and means directing said pumping beam into said pumping section to impinge on said crystal in a direction parallel to one of said crystal optical x and optical y axes and to polarize said pumping beam in a plane parallel to the other of said crystal x and y axes, said pumping beam producing signal and idler output beams in said crystal.

17. The generator of claim 16, further including means directing a selected one of said signal and idler beams out of said cavity.

18. The generator of claim 17, wherein said signal beam is polarized in the plane of said pumping beam.

19. The generator of claim 16, wherein said idler beam is polarized in the plane of the optical z axis of said crystal.

20. The generator of claim 16, wherein said pump laser is tunable to vary the wavelengths of said signal and idler output beams.

21. The generator of claim 16, further including means to vary the wavelengths of said signal and idler output beams.

* * * * *